(12) United States Patent
Rasoanarivo (10) Patent No.: US 9,577,549 B2
(45) Date of Patent: Feb. 21, 2017

(54) REVERSIBLE MATRIX CONVERTER CIRCUIT

(71) Applicant: UNIVERSITE DE LORRAINE, Nancy (FR)

(72) Inventor: Ignace Rasoanarivo, Villers les Nancy (FR)

(73) Assignee: UNIVERSITE DE LORRAINE, Nancy (FR)

( * ) Notice: Subject to any disclaimer, the term of this patent is extended or adjusted under 35 U.S.C. 154(b) by 0 days.

(21) Appl. No.: 14/407,817

(22) PCT Filed: Jun. 18, 2013

(86) PCT No.: PCT/EP2013/062667
§ 371 (c)(1),
(2) Date: Dec. 12, 2014

(87) PCT Pub. No.: WO2013/189952
PCT Pub. Date: Dec. 27, 2013

(65) Prior Publication Data
US 2015/0131348 A1    May 14, 2015

(30) Foreign Application Priority Data

Jun. 18, 2012  (FR) ...................... 12 55667

(51) Int. Cl.
*H02M 1/12* (2006.01)
*H02M 7/797* (2006.01)
(Continued)

(52) U.S. Cl.
CPC ............ *H02M 7/797* (2013.01); *H02M 5/293* (2013.01); *H02M 5/4585* (2013.01); *H02M 7/483* (2013.01)

(58) Field of Classification Search
CPC .. H02M 1/32; H02M 7/53873; H02M 7/4807; H02M 7/483; H02M 5/293; G05F 1/455
(Continued)

(56) References Cited

U.S. PATENT DOCUMENTS 6,005,787 A    12/1999  Mizukoshi
6,566,764 B2 *  5/2003  Rebsdorf ................ F03D 9/003
                                                              290/44
(Continued)

FOREIGN PATENT DOCUMENTS

EP    2320554    5/2011
FR    28812914   1/2005
(Continued)

OTHER PUBLICATIONS

Shamsi-Nejad M.A. et al., "Study of AC modulated hysteresis current controller for a single phase voltage source inventer", Industrial Electronics Society, 2005, IECON 2005, 31st Annual Conference of IEEE, IEEE, Piscataway, N. J., USA, Nov. 6, 2005, pp. 293-298.

(Continued)

*Primary Examiner* — Rajnikant Patel
(74) *Attorney, Agent, or Firm* — Greer, Burns & Crain, Ltd.

(57) ABSTRACT

A reversible matrix converter circuit is provided with n levels per phase including n conversion arms exhibiting on one side n ends for generating or receiving respectively n intermediate DC voltage levels, and exhibiting on another side n ends linked at a common point of AC signal input or output. The circuit includes: —two external arms linked respectively to the highest level of positive voltage and to the lowest level of negative voltage, these two external arms each having a single IGBT transistor or two power transistors, linked by their emitter, —two IGBT power transistors, (Continued)

linked in series by their emitter on each of the n−1 internal arms, —filtering capacitors disposed respectively between the n intermediate voltage levels.

17 Claims, 10 Drawing Sheets

(51) Int. Cl.
 *H02M 5/458* (2006.01)
 *H02M 7/483* (2007.01)
 *H02M 5/293* (2006.01)

(58) Field of Classification Search
 USPC ..... 363/16–17, 37, 39, 47, 51, 56.03, 56.12, 363/71, 131, 132, 149, 163, 41
 See application file for complete search history.

(56) References Cited

U.S. PATENT DOCUMENTS

| | | | |
|---|---|---|---|
| 6,930,899 B2* | 8/2005 | Bakran | H02M 7/487 363/132 |
| 7,226,840 B2* | 6/2007 | Chindalore | B82Y 10/00 257/330 |
| 7,599,752 B2* | 10/2009 | Chen | G05B 13/024 700/28 |
| 7,848,121 B2* | 12/2010 | Kojori | H02M 1/32 363/37 |
| 8,243,482 B2* | 8/2012 | Ueda | H02M 5/297 363/163 |
| 9,071,165 B2* | 6/2015 | Soua | H02M 7/487 |
| 2012/0243273 A1* | 9/2012 | Rasoanarivo | H02M 5/293 363/41 |

FOREIGN PATENT DOCUMENTS

| | | |
|---|---|---|
| FR | 2952485 | 5/2011 |
| WO | 0147094 | 6/2001 |
| WO | 2011058273 | 5/2011 |

OTHER PUBLICATIONS

International Search Report for PCT/EP2013/062667 mailed Dec. 12, 2013.
French Search Report for FR 1255667 dated Feb. 28, 2013.

* cited by examiner

REVERSIBLE MATRIX CONVERTER CIRCUIT

BACKGROUND

The present invention relates to a reversible matrix rectifier-inverter converter circuit with n levels per phase.

There are known multi-level rectifier circuits. Such circuits may or may not be controlled and make it possible to rectify a three-phase AC signal. Document WO 01/47094 A2, *"Method and Control Circuitry for a Three-Phase Three-Level Boost Rectifier"*, describes a three-phase 3-level rectifier which makes use of a diode bridge which makes the assembly non-reversible. Document FR2881294 describes a reversible rectifier based on IGBT transistors but in a non-multi-level structure. Document U.S. Pat. No. 6,005,787 describes a multi-level matrix converter circuit comprising several conversion arms supplied by different positive intermediate voltages and connected at the output at a common point generating an output current. The switches are made up of MOS and not IGBT transistors. Also, the voltages are solely positive.

There are also known matrix inverter circuits with n levels per phase comprising n conversion arms supplied respectively by n intermediate voltage levels and connected at the output at a common point generating an output current. Such a circuit is in particular described in document WO 2011/058273 A2, *"Multi-voltage multi-level matrix converter circuit, and method for implementing such a circuit"*

SUMMARY

The object of the present invention is a reversible rectifier-inverter matrix converter circuit with n levels per phase in which the quality of the currents processed on the AC side can be further improved with respect to the systems of the prior art. In particular, the aim is to obtain the most sinusoidal possible input and/or output currents. Another aim of the invention is to achieve a high rectification gain for the rectifier function.

At least one of the above mentioned objectives is achieved with a reversible matrix converter circuit with n levels per phase, n being mainly an odd number. This converter circuit comprises n conversion arms having on one side n ends for generating or receiving respectively n intermediate DC voltage levels and having on another side n ends connected at a common point of AC signal input or output, characterized in that the n conversion arms are distributed as follows:

two external arms dedicated on the intermediate DC voltages side to the two respectively positive and negative voltage levels that are the highest in absolute values $+V_{\frac{N-1}{2}}, -V_{\frac{N-1}{2}};$ these two external arms each comprising at least one IGBT transistor fitted with an anti-parallel internal diode, the current in these arms being controlled in one direction and natural in the other n−2 internal arms dedicated to the other n−2 intermediate DC voltage levels, these n−2 internal arms each comprising two IGBT transistors fitted with an anti-parallel internal diode and connected in series by their emitter n−1 filtering capacitors positioned respectively between the n intermediate DC voltage levels, and a management circuit for controlling the IGBT transistors in rectifier or inverter mode The present invention proposes a new reversible rectifier structure with n levels dedicated in particular to low voltage. As a non-limitative example, this rectifier is preferably used for n less than or equal to seven.

The use of IGBT transistors, combining the advantages of bipolar and MOS technologies, associated in particular with a relatively low switching frequency, of the order of a few kHz, provides for a reduction in switching and conduction losses and the implementation of simplified and not very dissipative control. It is also possible to envisage medium and high power applications: in this specific case, the single IGBT transistor of the external arm can be replaced by two transistors in series connected by their emitter, thus with the same topology as the transistors of the internal arms.

With the converter circuit according to the invention, the reversible "inverter-rectifier" function may open up broad possibilities with respect to the management of electrical energy in both directions of energy conversion: upstream-downstream and downstream-upstream.

With this reversible converter circuit according to the invention, an effective topology is produced, where the current conduction is ensured by a single transistor with two quadrants (with its internal diode) on the external arms and by a transistor with four quadrants on the internal arms. The conduction and switching losses in the switches, especially at low switching frequency, may be comparable or even lower than those of traditional multi-level converters.

With the use of IGBT transistors, the reversible converter circuit according to the invention can operate with hard switching with, however, strengthened solidity and viability: through the combined selection of a relatively low switching frequency, gate resistance $R_{gON}$ lower than gate resistance $R_{gOFF}$ and connection of the power switches on the principle of bus-bars with the outermost plates connected to earth. This type of cabling is widely acknowledged for effective protection with respect to electromagnetic interference.

According to the invention, in rectifier mode, in said n−2 internal arms:

for arms dedicated to positive intermediate DC voltage levels, the IGBT transistors positioned on the intermediate DC voltage side have their emitter connected to their gate; the positive current flowing in the IGBT transistor connected to the common AC point and in the internal diode of the other transistor of the same arm, and for arms dedicated to negative intermediate DC voltage levels, the IGBT transistors positioned on the common point side have their emitter connected to their gate; the negative current flowing in the connected IGBT transistor on the intermediate DC voltages side and in the internal diode of the other IGBT transistor of the same arm connected to the common AC point.

According to an advantageous feature of the invention, the management circuit comprises:

a modulated hysteresis control circuit to ensure the sinusoidal characteristics of the currents in the AC parts of the converter circuit, a stage switching circuit defining a stage switching level parameter $v^*_{st}$ used to control the IGBT transistors, and a distribution circuit, such as a programmable circuit, to distribute control signals to the IGBT transistors based on pulse width modulation signals originating from the modulated hysteresis control circuit and based on the stage switching level parameter By distribution circuit is meant, for example, a programmable circuit with parameters set for distributing control signals to different transistors.

With such control by modulated hysteresis, the harmonic current distortion rate (TDHi) may tend towards zero and the power factor is greatly improved thereby. This quality is particularly useful for all-electric on-board systems the source of which has energy that is limited over time: the performance of the converter is greatly improved due essentially to the low value of the switching frequency and to a perfectly flat voltage on the DC side, free from any high-frequency harmonic components.

Command and control by modulated current hysteresis may be in either a totally analogue implementation, or a totally digital implementation, thus simple and robust. The management circuit may comprise at least one DSP ("Digital Signal Processor") circuit for digital management.

Preferably, the modulated hysteresis control circuit comprises a control module by modulated current hysteresis having at the input:
- a positive reference current $I_{ref+}$ for positive half-cycles of the rectifier input signal
- a negative reference current $I_{ref-}$ for negative half-cycles of the rectifier input signal
- a triangular signal to be superimposed on the positive or negative reference current, and
- a line current per phase to be compared to the positive or negative reference current thus superimposed with the triangular signal In particular, the positive reference current $I_{ref+}$ can be obtained by adding a reference current $I_{ref0}$ with a positive variation $\Delta I_{ref+}$ of the reference current. Similarly, the negative reference current $I_{ref+}$ can be obtained by adding a reference current $I_{ref0}$ with a negative variation $\Delta I_{ref-}$ of the reference current.

This reference current $I_{ref0}$ may, for example, be obtained from a reference current of a rectifier load: depending on the fixed values of the active power and the reactive power of that load.

Preferably, the positive variation $\Delta I_{ref+}$ of the reference current is a signal originating from a controller having, at the input:
- a higher reference voltage $V_{ref\_sup}$, and
- one of the positive intermediate DC voltages.

One of the positive intermediate DC voltages may be the highest intermediate DC voltage.

Also, the negative variation $\Delta I_{ref-}$ of the reference current is advantageously a signal originating from a controller having, at the input:
- a higher reference voltage $V_{ref\_sup}$, and
- one of the negative intermediate DC voltages.

Similarly, one of the negative intermediate DC voltages may be the most negative intermediate DC voltage.

In addition in particular to the above, the stage switching circuit is supplied by:
- a positive stage switching parameter $V^*_{st+}$ originating from a controller having, at the input, a lower reference voltage $V_{ref\_inf}$ and one of the positive intermediate DC voltages, and
- a negative stage switching parameter $V^*_{st-}$ originating from a controller having, at the input, a lower reference voltage $V_{ref\_inf}$ and one of the negative intermediate DC voltages.

Also, one of the positive or negative intermediate DC voltages is the highest or most negative intermediate DC voltage respectively.

According to an advantageous feature of the invention, the controllers are of the fractional-order proportional-integral-derivative type.

With the converter circuit according to the invention, the input and output currents are perfectly sinusoidal and are totally controlled. The capacitor voltages are perfectly flat and symmetrical and can be continuously regulated. In this case, for example with a rectifier designed for 5 levels, there may then be either 5 levels or 3 levels of output voltage. Effective management of the signals limits the voltage and current fronts, which are the source of electromagnetic disturbances to the environment more or less close to the circuit.

Also, the rectification gain is greater than that of conventional rectification in three-phase mode. The operation of the converter can be broken down into two main sequences:
- When one of the switches of the central arm is under control and all the others OFF, the additional inductance λ of the network stores magnetic energy,
- When these switches are OFF and at least one of the switches of the arms is ON, this magnetic energy is transferred into the output capacitors and into the load.

This is the main operating characteristic of a BOOST converter. This will be explained below.

As a non-limitative example, the external arms may each comprise two IGBT transistors fitted with an anti-parallel internal diode, these two IGBT transistors being connected in series by their emitter.

According to the invention, a system is proposed comprising two converter circuits as described above, one of the two converter circuits being configured as a rectifier, the other as an inverter; the two converter circuits being positioned back to back.

BRIEF DESCRIPTION OF THE DRAWINGS

Other advantages and characteristics of the invention will appear upon examination of the detailed description of a method of implementation that is no way limitative, essentially in rectifier operating mode, and the attached drawings, wherein.

DETAILED DESCRIPTION

Figure 1:
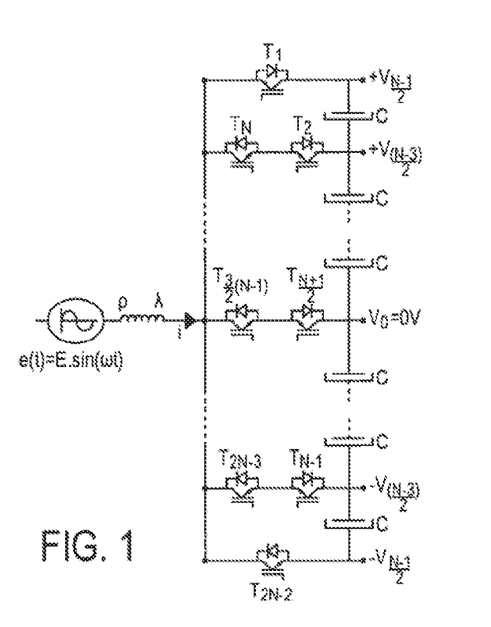
FIG. 1 is a simplified schematic view illustrating an arm of a rectifier with N (odd) levels according to the invention.

FIG. 1 shows a reversible single-phase topology according to the invention for N (odd) levels, where $T_1$ is the numbering of the IGBT switches, $V_1$ is the potential of an output point;

$V_0=0V$ is the potential of the centre point.

In rectifier operation, the input signal e(t) is applied, via an inductive circuit with resistance ρ and inductance λ, to a common point connecting N conversion arms. The two external conversion arms comprise a single IGBT transistor T1 and $T_{2N-2}$. The emitter of transistor T1 receives the input signal e(t). The emitter of transistor $T_{2N-2}$ is connected to the most negative output DC voltage point: $-V_{(N-1)/2}$.

The n−2 other internal conversion arms each comprising two IGBT transistors connected in series by their emitter are distinguished. Filtering capacitors C are positioned respectively between the n levels of intermediate voltages.

Figure 2:
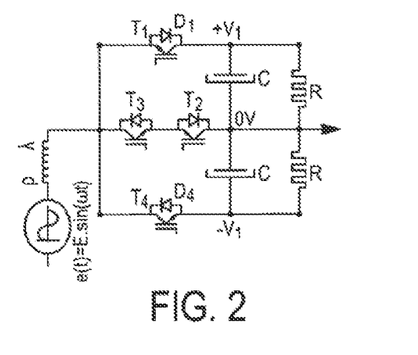
FIGS. 2 to 4 are schematic views illustrating the topology of an arm for a rectifier with respectively 3 levels, 5 levels, 7 levels.
Figure 3:
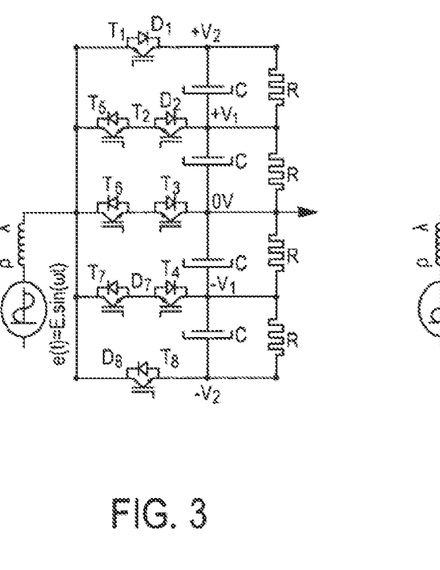
Figure 4:
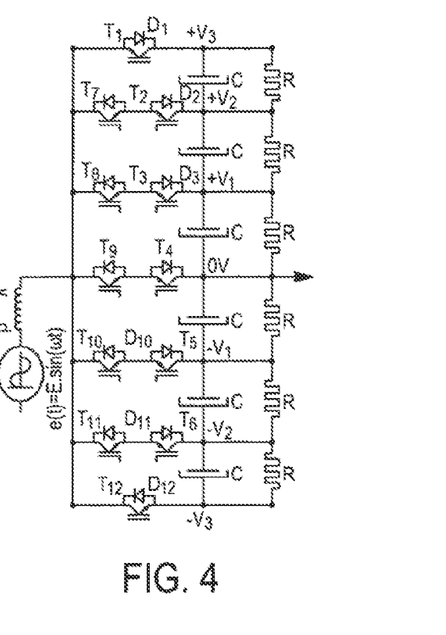

In order to provide for rectifier operation, the transistors numbered between $T_1$ and $$T_{\frac{N-1}{2}},$$

as well as those numbered between $$T_{\frac{3N-1}{2}}$$

and $T_{2N-2}$ should be cut off. Examples of topology with 3, 5 and 7 levels are shown in FIGS. 2, 3 and 4, with resistive output loads.

By way of example, operation can be analysed on the single-phase five-level converter: the network neutral and the 0V are connected. Assuming symmetrical rectifier operation, operation is qualitatively analysed during the positive half-cycle of supply voltage e, according to the diagram in FIG. 5. In this case, transistors $T_5$ and $T_6$ (respectively $T_3$ and $T_4$) are controlled during the positive (respectively negative) half-cycle of supply voltage e, see FIG. 5. Transistors $T_2$ and $T_7$ are cut off.

Figure 6A:
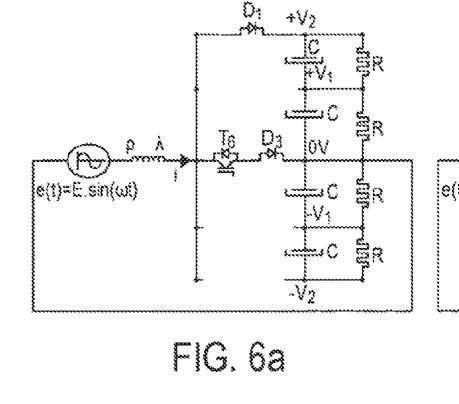
FIGS. 6a and 6b are schematic views illustrating configurations for two main sequences of 'Boost' operating modes.
Figure 6B:
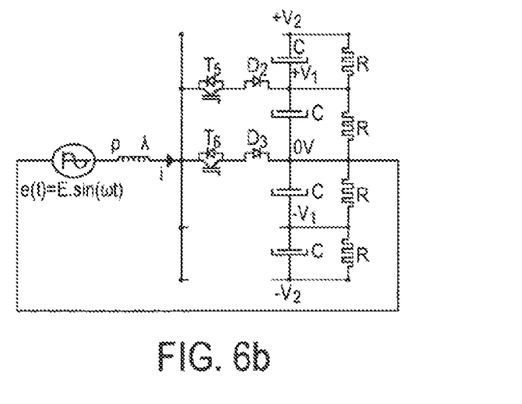

Thus, operation analysis is based on the two main sequences shown in FIGS. 6a and 6b:

In FIG. 6a, voltage $V_2$ is controlled by transistor $T_6$ and diode $D_1$: the change in sequence is natural as soon as the command to cut off $T_6$ has been given.

In FIG. 6b, voltage $V_2$ is controlled by transistors $T_6$ and $T_5$: in order to ensure the continuity of the current in inductance λ, transistor $T_5$ should first be turned on before cutting off transistor $T_6$.

Figure 7:
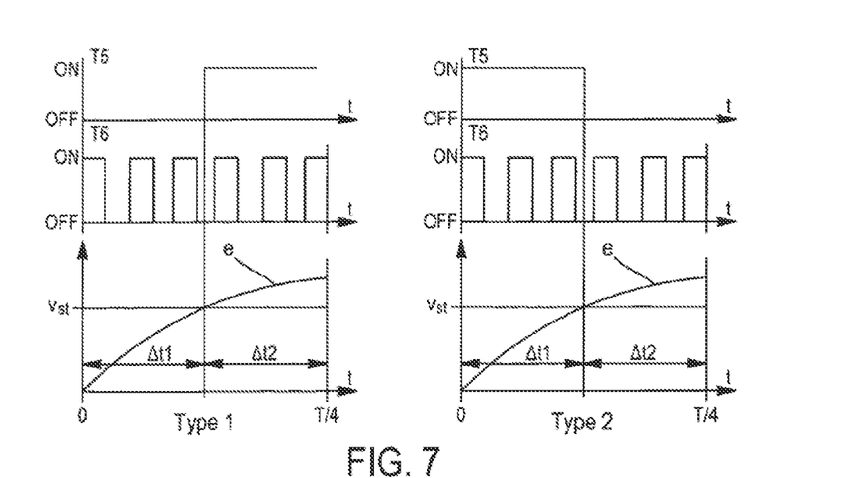
FIG. 7 is a schematic view illustrating two possibilities for close control.

As regards the control of the IGBT transistors, two types of close control may be provided. The 'Boost' effect is conventionally obtained by a single MLI command with a variable cyclical ratio for transistor $T_6$. As seen above, for the sequence in FIG. 6b, transistor $T_5$ must first be turned on before cutting off transistor $T_6$. Thus, consideration may be given, as illustrated in FIG. 7, to two ways in which to generate control triggers for $T_5$ (Type 1 and Type 2 strategies). These two strategies are based on a simple comparison of a DC voltage level $v_{st}$ with respect to supply voltage e, thus defining a stage switching level parameter $v^*_{st}$ according to:

$$v^*_{st} = \frac{v_{st}}{E_{peak}} E_{peak}$$

being the peak voltage value for input voltage e.

Figure 8:
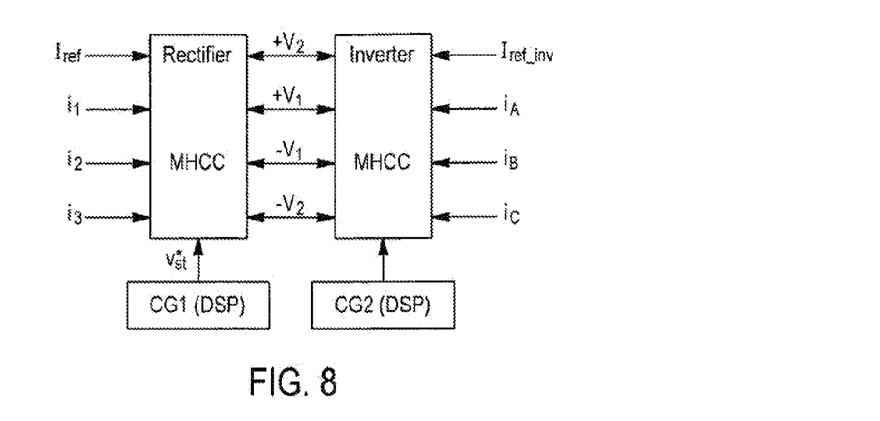
FIG. 8 is a schematic view illustrating current control.

Thus:

when $T_5$=OFF and $T_6$ controlled, then voltage $+v_2$ is controlled and voltage $+v_1$ is derived by a voltage division rule. In this case, there are five voltage levels at the output: $+v_2$, $+v_1$, 0V, $-v_1$, and $-v_2$;

when $T_5$=ON and $T_6$ controlled, then voltage $+v_1$ is controlled and for voltage $+v_2$, the capacitor is discharged into its resistor. If, during all of the positive half-cycle of source voltage e, $T_5$ remains active, voltage $+v_2$ becomes zero. In this case, there are only three voltage levels at the output: $+v_1$, 0V, and $-v_1$;

The general transistor control strategy can be developed in the case of back-to-back operation of two converters according to the invention: a rectifier circuit head-to-tail with an inverter circuit according to the invention. The behaviour of current i supplied by the supply network depends on transistor $T_6$ control strategy. It is possible to opt for modulated hysteretic current control (MHCC) to control currents drawn by the network and also inverter load currents. Preferably, use is made of a FOPID controller as will be seen in particular in FIG. 27. FIG. 8 shows a rectifier back-to-back with an inverter, with: $I_{ref}$ the network reference current and $I_{ref\_inv}$ the inverter reference current. FIG. 8 gives a block diagram of the control of rectifier line currents i1, i2 and i3, and inverter line currents iA, iB and iC. Similarly, the later FIG. 27 integrates a FOPID controller instead of the rectifier MHCC so as to manage the line currents. The FOPID can also be used to manage the inverter currents.

Thus, for active powers P and reactive powers Q supplied by the inverter:

$$V_{A\_rms1} * \frac{I_{ref\_inv}}{\sqrt{2}} = \frac{P}{\sqrt{3} \cdot \cos\left(\text{Arctg}\frac{P}{Q}\right)} \quad (1)$$

In order to solve this equation, either the fundamental value $V_{A\_rms1}$ of the line-to-neutral voltage of the inverter or the reference current $I_{ref\_inv}$ is known. In general, fast Fourier transform (FFT) of the line-to-neutral voltage of the inverter $V_{AN}$ highlights very great correlation of the fundamental of this voltage $V_{A\_rms1}$ with voltages $+v_2$ and $-v_2$ rather than with voltages $+v_1$ and $-v_1$. Thus, in symmetrical mode:

$$v_2 = K_{V\_rms1} * V_{A\_rms1} \quad (2)$$

The coefficient $K_{V\_rms1}$ can be defined by simulation: it depends very much on the operating mode of the multi-level inverter. The operating mode of the multi-level inverter is as described in document WO 2011/058273 A2. Assuming perfect switches, the retention of active powers between the network and the inverter load gives approximately:

$$\frac{I_{ref0}}{I_{ref\_inv}} = \frac{V_{A\_rms1}}{E_{RMS}} * \cos\phi \quad (3)$$

In uncontrolled operating mode, the four DC voltages at the output from the rectifier may be any whatsoever. Control of these voltages requires individualized monitoring of their instantaneous development. The schematic diagram of control according to the invention can be described in FIG. 9. Control is applied about an operating point defined by the rectifier reference current $I_{ref0}$ (according to equation 3).

In FIG. 8, it can be seen that each converter circuit is associated with a management circuit CG1 or CG2 based on a DSP. On the left, the rectifier is for example connected to an AC source such as a supply network. On the right, the inverter is in particular connected to an autonomous AC source having the double function of turbine or generator. The back-to-back converters according to the invention constitute a reversible assembly. Use is made of management circuits CG1 and CG2 to regulate the signals passing through the converters depending on whether the pump is operating as a turbine or a generator. Conversion takes place in one direction or the other.

Figure 9:
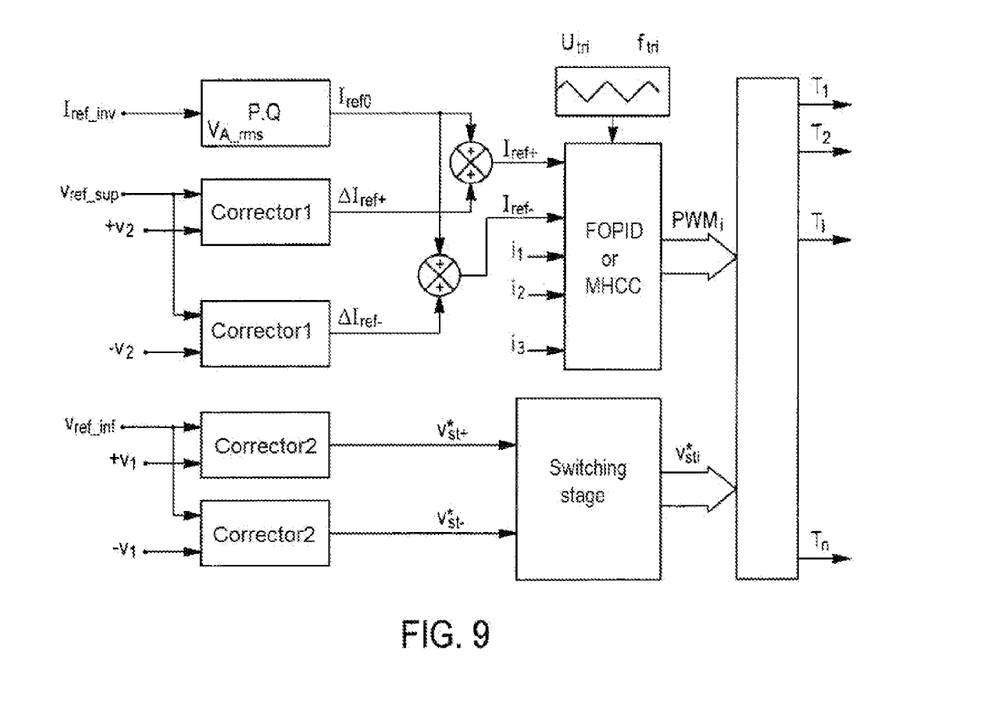
FIG. 9 is a simplified schematic view illustrating global control of the three-phase multi-level rectifier according to the invention.

In FIG. 9, it can be seen that reference current $I_{ref0}$ is obtained from a current $I_{ref\_inv}$, P, Q and $V_{A\_rms1}$. In the general case, for a given inverter load defined by a single voltage with effective value $V_{A\_rms1}$, an active power P and reactive power Q, this current is defined by:

$$I_{ref\_inv} = \sqrt{2} \cdot \frac{P}{\sqrt{3} \cdot V_{A\_rms1} \cdot \cos\left(\text{Artg}\frac{Q}{P}\right)} \quad (4)$$

Generally, the calculations are carried out digitally by means of a DSP circuit.

Comparison, by means of another controller called controller 1, of reference voltage $V_{ref\_sup}$ with the most positive output voltage $+v_2$ (respectively $\overline{V}_{ref\_sup}$ and with the most negative voltage $-v_2$) produces a variation $\Delta I_{ref+}$ (respectively $\Delta I_{ref-}$) of the reference current. Reference currents $I_{ref+}$ and $I_{ref-}$ resulting from the addition between $I_{ref0}$ and respectively $\Delta I_{ref+}$ and $\Delta I_{ref-}$ act as new references in MHCC or preferably FOPID control and will be associated respectively with the positive (respectively negative) half-cycle of the three line currents $i_1$, $i_2$, $i_3$.

Comparison, by means of another controller called controller 2, of $V_{ref\_inf}$ with $+v_1$ (respectively $-v_1$), generates the positive $v^*_{st+}$ and negative $v^*_{st-}$ stage switching level parameter: level $v_{st+}$ (respectively $v_{st-}$) is associated with the positive (respectively negative) half-cycles of the three three-phase voltages of sources $e_1$, $e_2$, $e_3$.

The four controllers used in this diagram are of the fractional-order proportional-integral-derivative (FOPID) type. The main advantages of this controller are: rapid dynamics, low overflow and almost zero phase error of the response signal. The response is almost instantaneous, no discharge. FOPID control is optimized by an algorithm managed by DSP.

In fact, through the individualized action of the four controllers:
reference $V_{ref\_sup}$ acts on the reference current of the three input currents to impose, through FOPID or MHCC control, sinusoidal characteristics and thus control the flatness and symmetry of voltages $+v_2$ and $-v_2$;
reference $V_{ref\_inf}$ directly controls the flatness and symmetry of voltages $+v_1$ and $-v_1$;

A description will now be given of an example of simulated operation of the converter circuit according to the invention. The following data are used:
Three-phase supply source: E=130 Vrms; f=50 Hz,
Inductance coil in series on the network side: $\rho$=0.1$\Omega$, $\lambda$=0.25 mH;
Capacitor banks: C=3000 $\mu$F.
Fundamental of the line-to-neutral voltage of the inverter: $V_{AN1}$=230 Vrms.

In FIG. 9, the different controllers, the FOPID (or MHCC) controller and the switching stage are advantageously implemented within the management circuit based on one or more DSP circuits. The Ti signal distributor may be a hard-wired logic.

Figure 10:
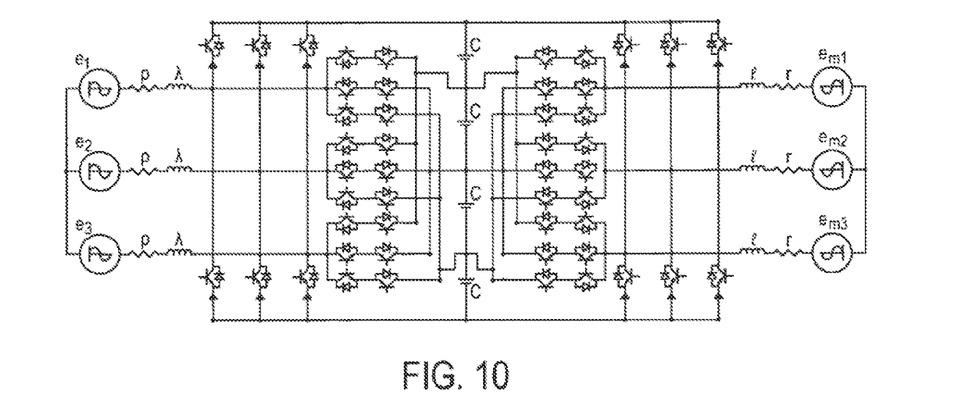
FIG. 10 is a simplified schematic view illustrating two back-to-back converters for five-level converters.

Analysis by simulation can be carried out directly on the simplified assembly of two three-phase back-to-back converters in FIG. 10: the left converter being in rectifier mode and the right, inverter.

1—Steady-State Analysis

Steady-state analysis makes it possible to determine the coefficient $K_{V\_rms1}$ indicated in equation (3). For this purpose, it is assumed that the system is in controlled mode, therefore voltages $+v_2$ and $-v_2$, as well as $+v_1$ and $-v_1$ are perfectly symmetrical. Thus: $V_{ref\_sup} = K_{V\_rms1} * V_{A\_rms1}$, and $$\frac{V_{ref\_sup}}{V_{ref\_inf}} = 2.$$

Figure 11A:
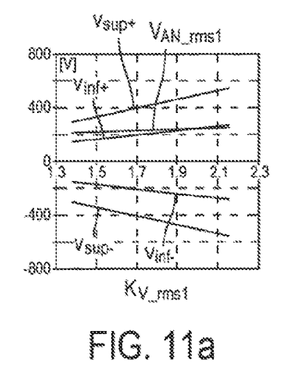
FIGS. 11a, 11b and 11c are simplified schematic views illustrating curves obtained by simulation emphasising the role of parameter $K_{V\_rms1}$.
Figure 11B:
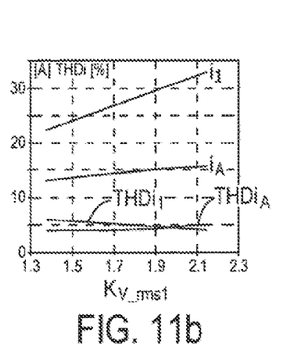
Figure 11C:
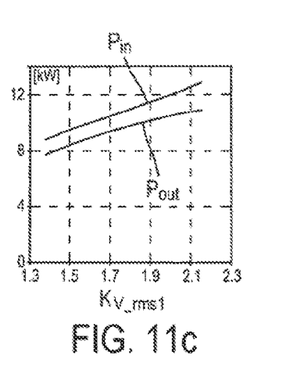

FIGS. 11a, 11b and 11c show the results of simulation as a function of parameter $K_{V\_rms1}$. In FIG. 11a, voltages $+v_2$, $-v_2$, $+v_1$ and $-v_1$ show perfectly linear characteristics and, in the variation range of parameter $K_{V\_rms1}$, the fundamental of the line-to-neutral voltage of the inverter $V_{A\_rms1}$ does not vary greatly around 230V. It is also found that the DC rectifier output voltages are symmetrical. In FIG. 11b, the currents develop linearly, with harmonic distortion rates (THD) around 5%, perfectly validating their sinusoidal characteristics. In FIG. 11c, the input powers $P_{in}$ and output powers $P_{out}$, with an inverter load having a phase angle of 10°, in practical terms can be regulated linearly thanks to parameter $K_{V\_rms1}$ with an efficiency around 90%.

For the continuation of the operation, in order to be able to fix at around 5% the rectifier current $THDi_i$ and the inverter current $THDI_A$ harmonic distortion rate, and for a value of 230V for the fundamental of the inverter phase-to-neutral voltage, $v_{ref\_sup}$=400V is selected.

First of all, the boost effect of the converter is indeed effective since, with an input voltage having an RMS value of 130V, a maximum DC voltage of 800V is obtained.

Figure 12:
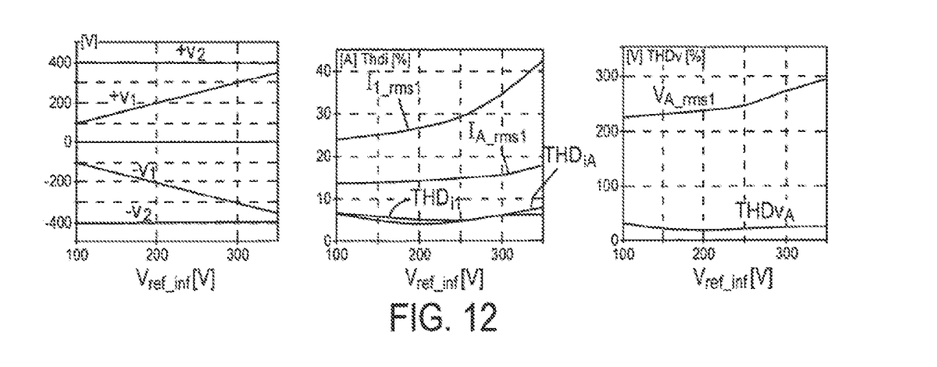
FIG. 12 is a simplified schematic view illustrating curves obtained by simulation emphasising the influence of reference $V_{ref\_Inf}$ with $V_{ref\_sup}$=400V.

It is then possible to show the effect of parameter $v^*_{st}$. FIGS. 12a, 12b and 12c show the results of simulation as a function of reference $V_{ref\_inf}$, for an inverter load around 10 kW and an angle of 10° for the load argument.

In FIG. 12a, voltages $+v_2$ and $-v_2$ are indeed flat and opposite, while voltages $+v_1$ and $-v_1$ are linearly opposite. In FIG. 12b, the current THDs remain below 8%, thus emphasising their almost sinusoidal characteristics. Reference $V_{ref\_inf}$ also makes it possible to regulate the input and output currents. In FIG. 12c, the line-to-neutral voltage of the inverter may develop as a function of $V_{ref\_inf}$, but with a THD around 30%.

Figure 13:
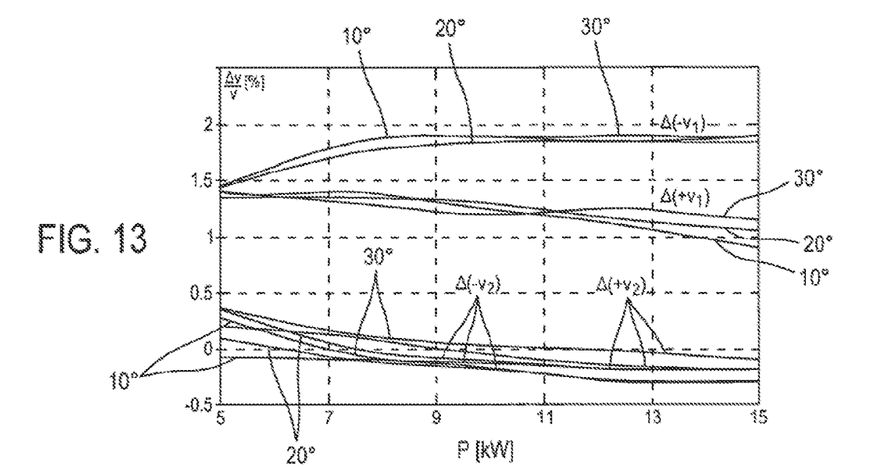
FIG. 13 is a simplified schematic view illustrating curves of relative variation of the four voltages $+v_2$, $-v_1$, $+v_1$ and $-v_1$ as a function of the inverter load.

Lastly, results are shown which emphasise the rigidity of the four DC rectifier output voltages, with powers supplied by the inverter of P=5, 7.5, 10, 12.5, 15 kW and load angles φ=10, 20, 30° and, for the reference values: $V_{ref\_sup}$=400V and $V_{ref\_inf}$=200V. FIG. 13 shows the relative variations of the four voltages $+v_2$, $-v_2$, $+v_1$ and $-v_1$ as a function of the inverter load: it is found that the greatest relative variation does not exceed ±2% and these variations only depend very slightly on the load angle φ.

2—Analysis in Dynamic State

Figure 14:
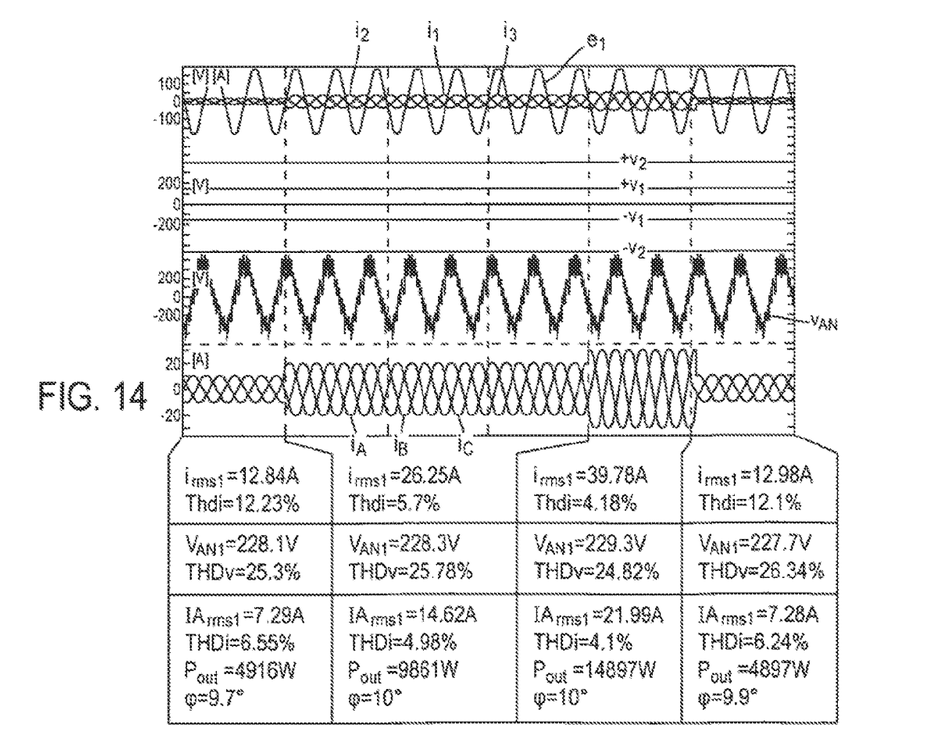
FIG. 14 is a simplified schematic view illustrating wave forms and performances during sharp variations in the inverter load.

The following results describe a dynamic behaviour of the assembly, underlining the justification of the strategy developed. These results are of three kinds, following sharp variations in:

the inverter load
the inverter operating frequency
references $V_{ref\_sup}$ and $V_{ref\_inf}$ a—Effect of the Inverter Load FIG. 14 shows the wave forms and performances of the two back-to-back converters during four sudden variations in the inverter load, represented by the supplied power $P_{out}$. It is found that the responses of the two converters are quasi-instantaneous. Furthermore, voltages $+v_2$, $+v_1$, $-v_1$, and $-v_2$ are perfectly flat and symmetrical with a ratio of $$\frac{+v_2}{+v_1} = \frac{400}{150}$$

and remain insensitive to the sharp variations imposed. The AC input and output currents are perfectly sinusoidal with low values for harmonic distortion rates THD. The fundamental value of the line-to-neutral voltage of the inverter as well as the associated THD are practically invariant. The rectification ratio is $$\frac{800 \text{ V}}{\frac{3.130 \cdot \sqrt{6}}{\pi} \text{V}} = 2.631$$

b—Effect of the Inverter Operating Frequency

Figure 15:
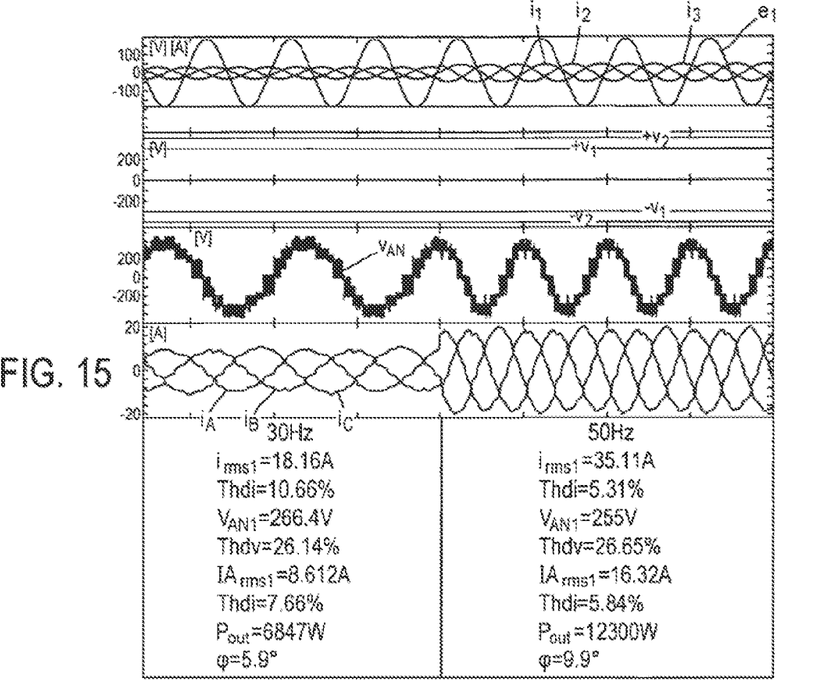
FIG. 15 is a simplified schematic view illustrating wave forms and performances during sharp variations in the inverter operating frequency.

In this part, the inverter operating frequency is changed suddenly from 30 Hz to 50 Hz, with a ratio $$\frac{V_{ref\_sup}}{V_{ref\_inf}} = \frac{400 \text{ V}}{300 \text{ V}}.$$

FIG. 15 verifies the perfect flatness and symmetry of the DC rectifier output voltages. The AC currents, at the input and output, are sinusoidal with small THD values. These values are optimal when applying FOPID control for the two converters. When using an MHCC control, they can be improved by further refining MHCC control of the two converters. The fundamental of the line-to-neutral voltage of the inverter $V_{AN}$ does not vary enormously, with a quasi-constant THD. These results emphasize the perfect frequency decoupling of the two converters.

3—Effect of Variations in References $V_{ref\_sup}$ and $V_{ref\_inf}$

For section, operations are carried out in three parts:

$$\frac{V_{ref\_sup}}{V_{ref\_inf}} = \frac{400 \text{ V}}{300 \text{ V}}$$

during $$t_1, \frac{V_{ref\_sup}}{V_{ref\_inf}} = \frac{400 \text{ V}}{200 \text{ V}}$$

during $t_{r1}+t_2$, and finally $$\frac{V_{ref\_sup}}{V_{ref\_inf}} = \frac{300 \text{ V}}{200 \text{ V}}$$

during $t_{r2}+t_3$. The inverter load remained the same during these operations.

Figure 16:
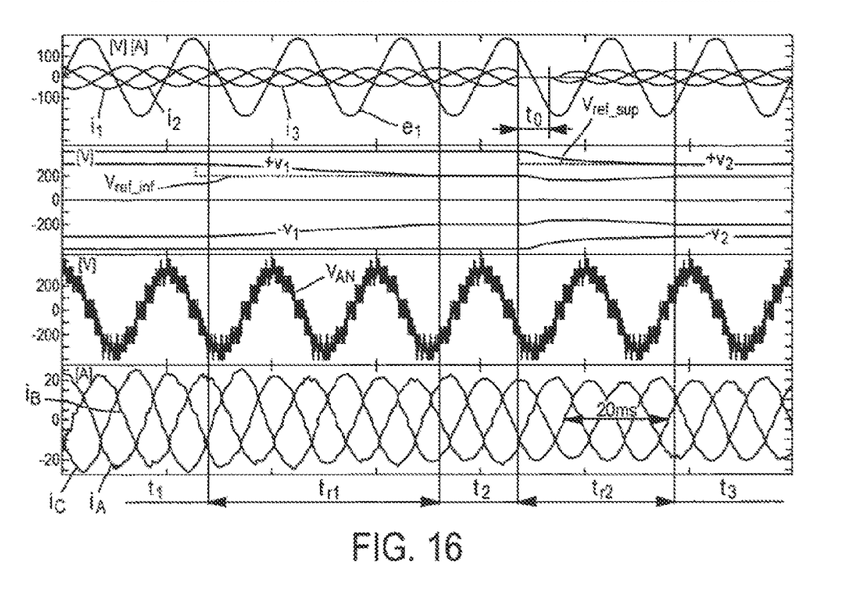
FIG. 16 is a simplified schematic view illustrating waveforms and performances during sharp variations in references $V_{ref\_sup}$ and $V_{ref\_inf}$.

In FIG. 16, the impacts of the variations in references $V_{ref\_sup}$ and $V_{ref\_inf}$ are minimal on the operation of the inverter: invariant characteristics of the simple voltage $V_{AN}$ and three-phase sinusoidal currents. This also indicates the functional decoupling of the two converters.

Furthermore, during the time interval $t_{r1}$ where a variation in $V_{ref\_inf}$ is imposed, the two voltages $+v_2$ and $-v_2$ are practically invariant, while the two voltages $+v_1$ and $-v_1$ vary symmetrically. During the second time interval $t_{r2}$, the four voltages vary at the same time and, during the first moments $t_0$, it is observed that the input network currents are zero, validating the configuration where the rectifier is totally open. It should also be noted that, during these disturbances, the reaction of the system with respect to alternating quantities of the two converters is quasi-instantaneous and that the input currents remain practically sinusoidal.

Generally, the topology described in document WO2001/058273 is partially reversible: the current passing into the diodes of the outermost arms cannot be regulated. On the other hand, it is totally reversible for the internal arms with control of the energy exchanges.

In addition in particular to the above description, another purpose of the present invention is a totally reversible operation in rectifier mode and inverter mode of the multi-level converters. Like the converters known as matrix converters, the fundamental principle is to use a switch equivalent to 4 quadrants, known as a 'Four Quadrants Switch' (FQS) for all the arms. This equivalent switch is made up of two power transistors fitted with their internal diode and put in series by their collector. The direction of the current in the arm is then imposed and controlled by the controlled switch. The notable difference with the preceding structure in patent WO 2011/058273 A2 is the addition of transistors on the most positive bus-bar and on the most negative arm, as can be seen in FIGS. 17a and 17b.

Figure 17A:
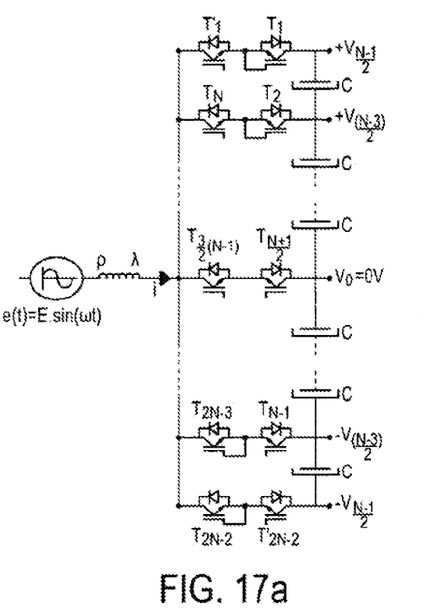
FIGS. 17a and 17b are schematic views of the arms of a converter with N (odd) levels in a completely reversible mode.
Figure 17B:
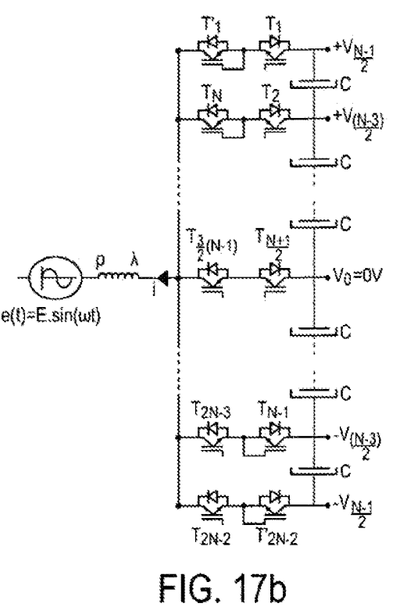

FIGS. 17a and 17b represent the single-phase, completely reversible topology for N (odd) levels. FIG. 17a relates to operation as multi-level rectifier. FIG. 17b relates to operation as multi-level recovery. The values ρ,λ, can be supplied by a coupling transformer. The following are used in FIGS. 17a and 17b:

$T_1$ is the numbering of the IGBT switches
$V_1$ is the potential assigned to an output bus-bar
$V_0=0V$ is the potential of the centre point
In particular two operating modes are envisaged:
Inverter mode
Rectifier mode
Inverter mode operation is similar to that in document WO 2011/058273 A2, while integrating the specific controls of transistors $T'_1$ and $T'_{2N-2}$. However, two operating modes may be understood:
Balanced symmetrical mode
Unbalanced and (or) dissymmetrical mode
In the case of a balanced symmetrical mode, if reversibility with total control is not required, transistors $T'_1$ and $T'_{2N-2}$ can be removed to return to the topology in document WO 2011/058273 A2.

Figure 18:
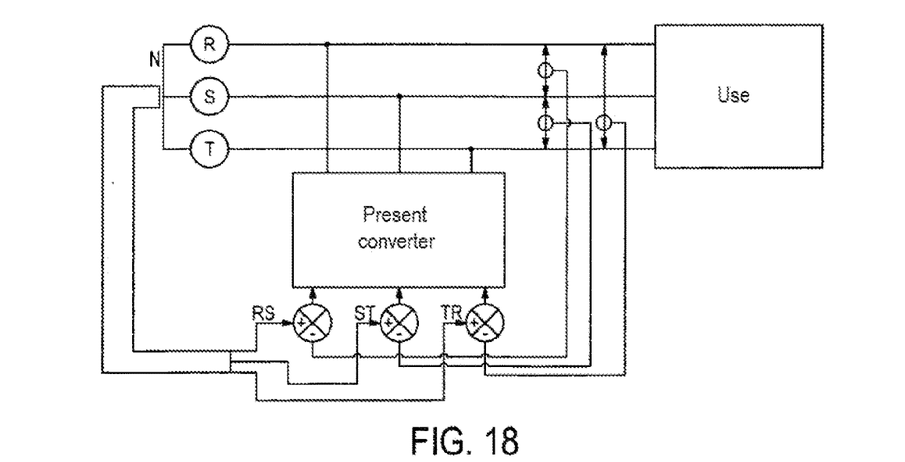
FIG. 18 is a simplified schematic view illustrating an electrical network with compensation for unbalanced operation.

Unbalanced and (or) dissymmetrical mode may for example be the case in an unbalanced electrical network, see FIG. 18. If the voltages at the usage terminals are unbalanced, the present converter compensates for such imbalances. This type of operation is often found in isolated autonomous networks (for example, on-board network on boats, etc.).

Figure 5:
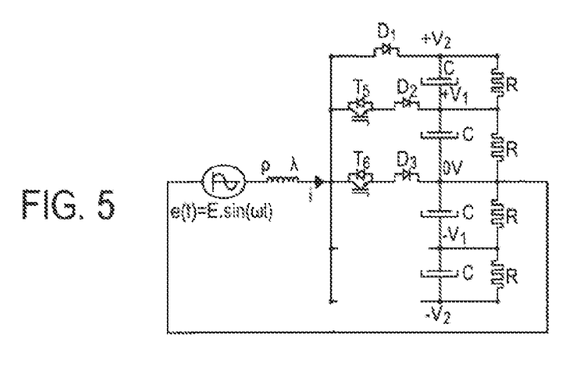
FIG. 5 is a schematic view illustrating a configuration for the positive half-cycle of supply voltage e.

In the case of an unbalanced and (or) dissymmetrical mode, the two transistors $T'_1$ and $T'_{2N-2}$ have an important role to play. Two examples of compensation of voltage imbalance are shown in FIGS. 4 and 5, if a five-level converter is used. The close controls of the power switches are those already described in patent WO 2011/058273 A2, while integrating the specific controls of transistors $T'_1$ and $T'_{2N-2}$.

Figure 19:
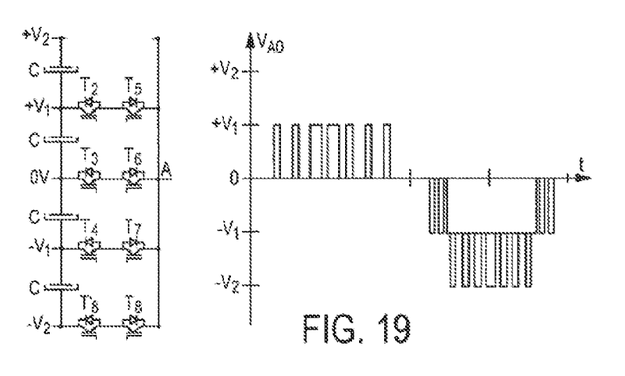
FIGS. 19 and 20 are simplified schematic views illustrating a compensation circuit for imbalance on the negative then positive voltage half-cycle.

FIG. 19 shows on the left a structure for compensation of an imbalance on the negative voltage half-cycle. The output voltage wave is represented on the right.

Figure 20:
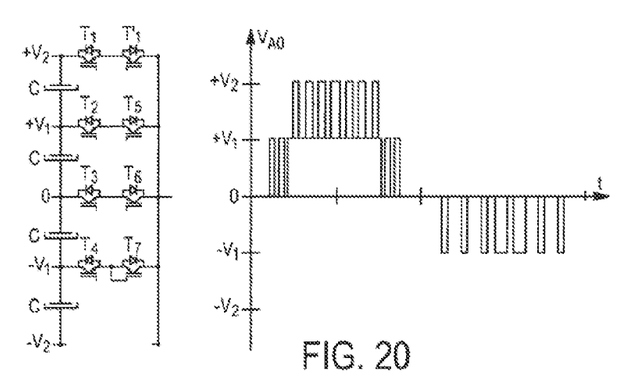

FIG. 20 shows on the left a structure for compensation of an imbalance on the positive voltage half-cycle. The output voltage wave is represented on the right.

With negative voltage half-cycle, transistor T'1 is cut off while transistors T8 and T'8 are active. The operation is the opposite with positive half-cycle, T'8 cut off while T1 and T'1 are active.

If the imbalance disappears, the converter operates as a rectifier in order to maintain the capacitor charges.

Figure 21A:
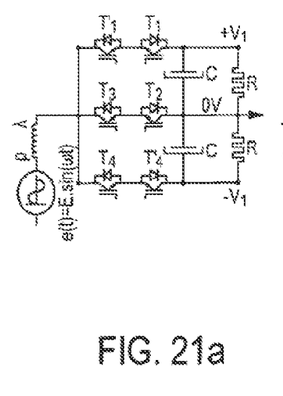
FIGS. 21a, 21b and 21c are simplified schematic views illustrating examples of the topology of an arm for a rectifier with 3 levels (left), 5 levels (centre), 7 levels (right)
Figure 21B:
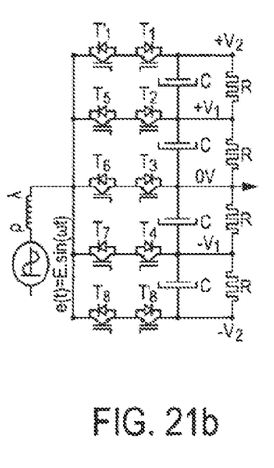
Figure 21C:
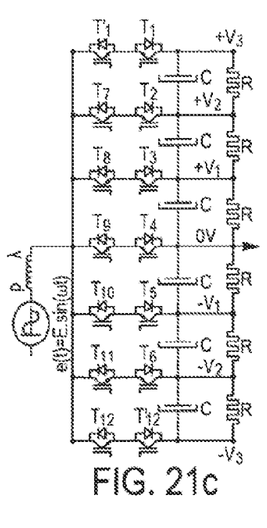

Operation in rectifier mode may be described on the basis of examples of topologies with 3, 5 and 7 levels in accordance with FIGS. 21a, 21b and 21c for resistive output loads.

The anticipated objectives are of three kinds:

The AC input currents are perfectly sinusoidal and are totally controlled: the harmonic content of these currents must comply with the electromagnetic compatibility standards in force.

The capacitor voltages are perfectly flat (therefore do not contain any pulsating components). They can be continuously and individually regulated. And thanks to the control, it is also possible equally well to have, for example for a 5-level rectifier, either 5 levels, or 4 levels, or three levels, or two levels for the output voltage. The possibility for operation with two-by-two symmetrical output voltages or dissymmetrical output voltages may be envisaged.

The rectification gain is greater than that of a conventional rectification in three-phase mode.

1—Analysis of Operation in Rectifier Mode

Figure 22:
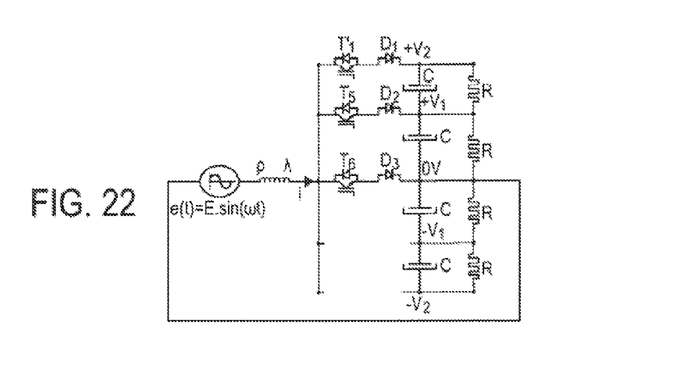
FIG. 22 is a simplified schematic view illustrating a configuration for the positive half-cycle of supply voltage e.

Analysis of operation can be carried out on the single-phase five-level converter in FIG. 21b: the network neutral and the 0V are connected. Analysis of symmetrical rectifier operation may be as follows. Qualitative analysis during the positive half-cycle of supply voltage e is based on the diagram in FIG. 22. Transistors $T'_1$, $T_5$ and $T_6$ are controlled during the positive half-cycle (respectively $T_3$, $T_4$ and $T'_8$ during the negative half-cycle) of supply voltage e.

Figure 23A:
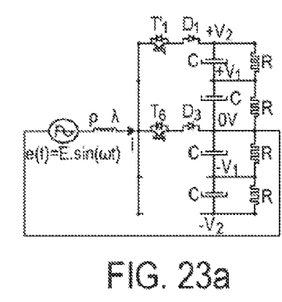
FIGS. 23a, 23b and 23c are simplified schematic views illustrating configurations during the positive half-cycle of supply voltage e for controlling the voltage $V_2$.
Figure 23B:
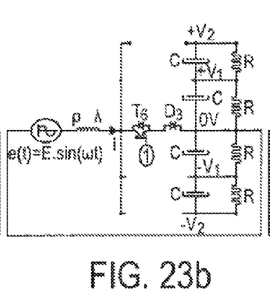
Figure 23C:
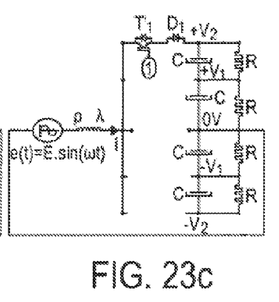
Figure 24A:
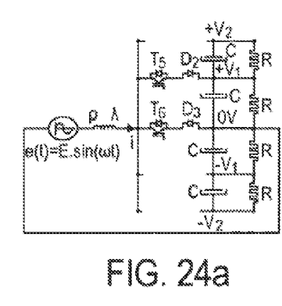
FIGS. 24a, 24b and 24c are simplified schematic views illustrating configurations during the positive half-cycle of supply voltage e for controlling voltage $V_1$.
Figure 24B:
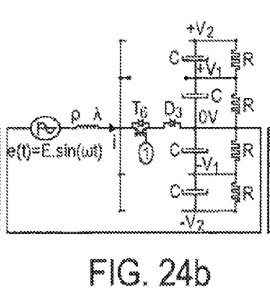
Figure 24C:
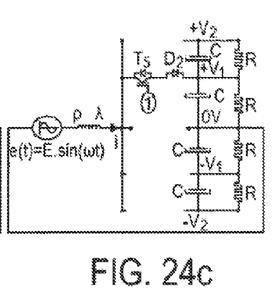

Thus, analysis of operation is based on the main sequences shown in FIGS. 23 and 24:

FIG. 23a shows the sequence for the control of the voltage $V_2$. FIG. 23b, by turning on $T_6$, allows inductance λ to be magnetized; in this case, control of transistor $T'_1$ can equally well be 0 or 1 since diode $D_1$ remains cut off (voltage at its terminals equal to $-V_2$). FIG. 23c is valid as soon as transistor $T_6$ has been ordered to be cut off, but having first ordered transistor $T'_1$ to be turned on. The two sequences in FIGS. 23b and 23c are the two main sequences describing a step-up chopper or BOOST operating mode.

FIG. 24a shows the sequence for the control of the voltage $V_1$. FIG. 24b, by turning on $T_6$, allows inductance λ to be magnetized; in this case, the controls for transistors $T'_1$ and $T_5$ can equally well be equal to 0 or 1 since diodes $D_1$ and $D_2$ remain cut off (voltage at the terminals of $D_1$ equal to $V_1-V_2$, voltage at the terminals of $D_2$ equal to $-V_1$). FIG. 24c is valid as soon as transistor $T_6$ has been ordered to be cut off, but having first ordered transistor $T_5$ to be turned on. The two sequences in FIGS. 24b and 24c are the two main sequences describing a step-up chopper or BOOST operating mode.

2—Close Control

The 'Boost' effect is conventionally obtained by a single MLI control with a variable cyclical ratio for transistor $T_6$. Control of voltage $V_2$ is carried out with controls for transistors $T'_1$ and $T_6$, while control of voltage $V_1$, with controls for transistors $T_5$ and $T_6$.

Figure 25A:
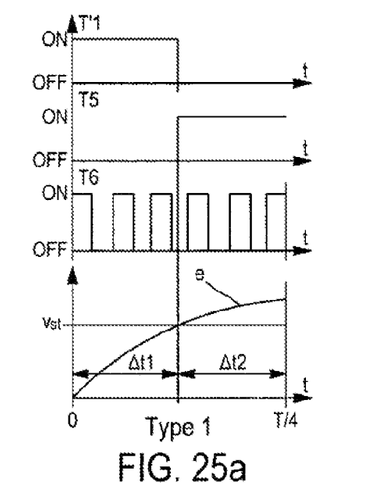
FIGS. 25a and 25b are simplified schematic views illustrating two possibilities for close control.
Figure 25B:
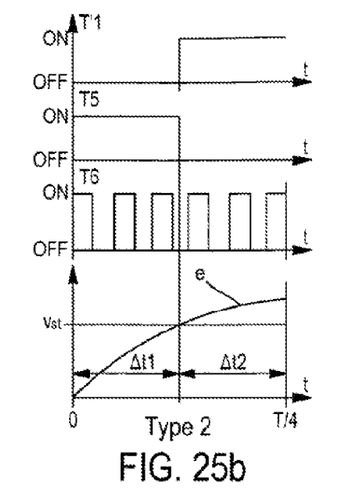

Thus, FIGS. 25a and 25b present two ways of managing the control triggers on $T'_1$, $T_5$ and $T_6$ according to Type 1 and Type 2 strategies. These two strategies are based on a simple comparison of a DC voltage level $v_{st}$ with respect to an individual wave in phase with the supply voltage e, thus defining the stage switching level parameter v*$_{st}$ according to:

$$v_{st}^* = \frac{v_{st}}{E_{peak}}$$

Thus:

When T$_5$=OFF, T'$_1$=ON, and T$_6$ controlled, then voltage +v$_2$ is controlled and voltage +v$_1$ is derived by a simple voltage division rule. In this case, there are five voltage levels at the output: +v$_2$, +v$_1$, 0V, −v$_1$, and −v$_2$;

when T$_5$=ON, T'$_1$=OFF, and T$_6$ controlled, then voltage +v$_1$ is controlled and, for voltage +v$_2$, the capacitor is discharged into its resistor.

If, during all of the positive half-cycle of the source voltage e, T$_5$ remains active and T'$_1$ remains cut off, voltage +v$_2$ may become zero. In this case, there are only three voltage levels at the output: +v$_1$, 0V, and −v$_1$;

It is then found that the output voltage may have either 5 levels or 3 levels.

By stage switching circuit is meant a circuit making it possible to change the increments in the voltage pattern of a multi-level inverter. This change of increment may be fine (passing from increment i, thus from voltage level i, to increment i+1, voltage level i+1), or coarse (passing from increment i to increment k).

The stage switching level may be defined as follows. If N is the number of DC voltage levels, the stage switching levels are DC voltages between +1 and −1 and compared with sinusoidal waves with unitary amplitude A$_i$(t), and in phase with the single voltages on the AC side e$_i$(t), with i∈[1,2,3] for a three-phase system. If N is odd, the number of these levels is $$\frac{N-1}{2}.$$

If N is even, the number of these levels is $$\frac{N-2}{2}.$$

These values are only defined for N greater than or equal to 3. And for N=3, the value of this level is 0V, therefore a symmetrical operation.

In the general case, for symmetrical operation, these voltage levels are opposite two-by-two. For any operation, the number of voltage levels $$\frac{N-1}{4}$$

is positive, while the number of voltage levels $$\frac{N-1}{4}$$

is negative.

In our case, for a 5-level inverter and symmetrical operation, we have two voltage levels with opposite signs, with +v$_{st}$, and −v$_{st}$.

For the transistors in the positive arm (respectively negative arm), therefore connected to the positive (respectively negative) voltage bus-bars:

When A$_i$(t)≤v$_{st}$, (respectively A$_i$(t)≥−v$_{st}$), it is the transistors connected to the first voltage of the bus-bar directly higher (respectively lower) than potential 0 which are implemented (turning on and cutting off).

When A$_i$(t)>v$_{st}$ (respectively A$_i$(t)<−v$_{st}$), it is the transistors connected to the second positive (respectively negative) voltage of the bus-bar after the preceding one which are implemented (turning on and cutting off).

Therefore, depending on the value of the unitary reference voltage A$_i$(t) before the stage switching voltage levels, the transistors of the arm connected to a well defined bus-bar voltage and thus generating a DC voltage increment are controlled (turning on and cutting off) arbitrarily.

The unitary reference voltage A$_i$(t) and the stage switching voltage levels form part of the close control strategy for the assembly. These values are fundamentally useful to ensure the existence of different voltage increments for the multi-level inverters. This is at the origin of the term stage switching circuit.

3—General Control Strategy

The general control strategy consists in implementing closed loops on the converter operation. It is possible to take the example of a particular usage mode: the case of back-to-back operation of the two converters, the flow diagram for which is given in FIG. 26. The main advantage is above all with respect to operation as a rectifier, thus the left converter in FIG. 26.

The anticipated objectives consist of supplying the multi-level converter (right converter in FIG. 26) with perfectly flat and two-by-two symmetrical bus-bar voltages (not loaded with oscillating components), sinusoidal input currents i$_1$, i$_2$, i$_3$ in total observance of EMC standards, a practically unitary power factor and minimal losses in the converter.

The behaviour of the line currents i$_1$, i$_2$, i$_3$ supplied by the supply network depends on the control strategy. Thus, several very high performance controllers can be used:

Control by modulated hysteresis current ('Modulated Hysteresis Current Control—MHCC);

A new type of control: 'Fractional-Order Proportional-Integral-Derivative' (FOPID).

Figure 27:
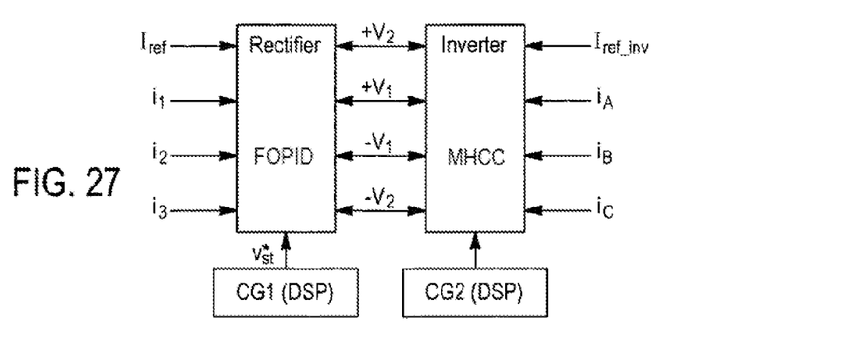
FIG. 27 is a simplified schematic view illustrating the management of currents based on a FOPID controller for the rectifier.

In the present case, it is preferable to use a FOPID for the rectifier and/or for the inverter. FIG. 27 describes a mode using a FOPID for the rectifier and a MHCC for the inverter.

Figure 26:
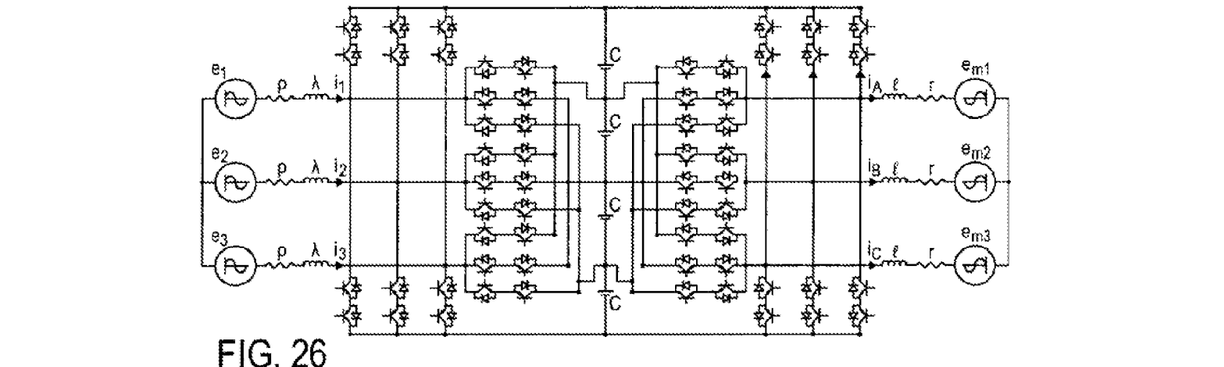
FIG. 26 is a simplified schematic view illustrating two back-to-back converters based on five-level converters for completely reversible conversion.

FIG. 26 uses the same structural base as FIG. 10, supplementing it so as to be completely reversible with a control preferably based on FOPID.

The description for FIGS. 8, 9 and 10 can also be used for FIGS. 26 and 27 with respect to what they have in common.

The reversible 'inverter-rectifier' operation of a converter may open up broad possibilities above all with respect to the management of electrical energy in both directions of energy conversion: upstream-downstream and downstream-upstream. This approach is not yet widespread for multi-level converters. It must be implemented in total observance of the very stringent electromagnetic compatibility standards and highly efficient usage of the energy involved: very good efficiency (low switching and power contact-breaker conduction losses), high reliability and very broad practicability, highly secure power contact-breaker integrity, very advantageous dynamic behaviour and very stable permanent mode, etc.

Of course, the invention is not limited to the examples which have just been described and numerous adjustments can be made to these examples without exceeding the scope of the invention.

The invention claimed is:

1. A reversible matrix converter circuit with n levels per phase comprising:
   n conversion arms having on one side n ends for generating or receiving respectively n intermediate DC voltage levels and having on another side n ends connected at a common point of AC signal input or output, the n conversion arms being distributed as follows:
   two external arms dedicated on the intermediate DC voltages side to the two highest respectively positive and negative voltage levels in absolute values;
   n−2 internal arms dedicated to the other n−2 intermediate DC voltage levels, said n−2 internal arms each comprising two IGBT transistors fitted with an anti-parallel internal diode and connected in series by an emitter;
   n−1 filtering capacitors positioned respectively between the n intermediate DC voltage levels; and
   a management circuit for controlling the IGBT transistors in rectifier or inverter mode, said management circuit comprising at least one controller of the fractional-order proportional-integral-derivative type, known as a FOPID controller, the external arms each comprising two IGBT transistors fitted with an anti-parallel internal diode, said two IGBT transistors being connected in series by an emitter, such that the matrix converter circuit is reversible.

2. The converter circuit according to claim 1, characterized in that, in rectifier mode, in said n−2 internal arms:
   for arms dedicated to positive intermediate DC voltage levels, the IGBT transistors positioned on the intermediate DC voltage side have their emitter connected to their gate; the positive current flowing in the IGBT transistor connected to the common AC point and in the internal diode of the other transistor of the same arm; and
   for arms dedicated to negative intermediate DC voltage levels, the IGBT transistors positioned on the common point side have their emitter connected to their gate; the negative current flowing in the connected IGBT transistor on the intermediate DC voltages side and in the internal diode of the other IGBT transistor of the same arm connected to the common AC point.

3. The converter circuit according to claim 1, characterized in that the management circuit comprises at least one DSP (Digital Signal Processor) circuit for digital management.

4. The converter circuit according to claim 1, characterized in that the management circuit comprises:
   a FOPID controller to ensure the sinusoidal characteristics of the currents in the AC parts of the converter circuit,
   a stage switching circuit defining a stage switching level parameter used to control the IGBT transistors, and
   a distribution circuit to distribute control signals to the IGBT transistors based on pulse width modulation signals originating from the FOPID controller and based on the stage switching level parameter.

5. The converter circuit according to claim 4, characterized in that the FOPID controller has at the input:
   a positive reference current for positive half-waves of the rectifier input signal;
   a negative reference current for negative half-waves of the rectifier input signal;
   a triangular signal to be superimposed on the positive or negative reference current; and
   a line current per phase to be compared to the positive or negative reference current thus superimposed with the triangular signal.

6. The converter circuit according to claim 5, characterized in that the positive reference current is obtained by adding a reference current with a positive variation of the reference current.

7. The converter circuit according to claim 5, characterized in that the negative reference current is obtained by adding a reference current with a negative variation of the reference current.

8. The converter circuit according to claim 6, characterized in that the reference current is obtained from a reference current of a rectifier load.

9. The converter circuit according to claim 6, characterized in that the positive variation of the reference current is a signal originating from a controller having, at the input:
   a higher reference voltage; and
   one of the positive intermediate DC voltages.

10. The converter circuit according to claim 9, characterized in that one of the positive intermediate DC voltages is the highest intermediate DC voltage.

11. The converter circuit according to claim 7, characterized in that the negative variation of the reference current is a signal originating from a controller having, at the input:
    a higher reference voltage, and
    one of the negative intermediate DC voltages.

12. The converter circuit according to claim 11, characterized in that one of the negative intermediate DC voltages is the most negative intermediate DC voltage.

13. The converter circuit according to claim 4, characterized in that the stage switching circuit is supplied by:
    a positive stage switching parameter originating from a controller having, at the input, a lower reference voltage and one of the positive intermediate DC voltages, and
    a negative stage switching parameter originating from a controller having, at the input, a lower reference voltage and one of the negative intermediate DC voltages.

14. The converter circuit according to claim 13, characterized in that one of the positive or negative intermediate DC voltages is the highest or most negative intermediate DC voltage respectively.

15. The converter circuit according to claim 9, characterized in that the very high performance controllers are of the fractional-order proportional-integral-derivative type.

16. The converter circuit according to claim 1, characterized in that the external arms each comprise two IGBT transistors fitted with an anti-parallel internal diode, these two IGBT transistors being connected in series by their emitter.

17. The system comprising two converter circuits according to claim 1, one of the two converter circuits being configured as a rectifier, the other as an inverter; the two converter circuits being positioned back to back.

* * * * *